United States Patent
Suzuki (10) Patent No.: US 7,971,474 B2
(45) Date of Patent: *Jul. 5, 2011

(54) INTERNAL COMBUSTION ENGINE SYSTEM AND ENGINE MISFIRE DETECTION METHOD FOR INTERNAL COMBUSTION ENGINE

(75) Inventor: Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 189 days.

This patent is subject to a terminal disclaimer.

(21) Appl. No.: 12/300,393

(22) PCT Filed: May 14, 2007

(86) PCT No.: PCT/JP2007/059904
§ 371 (c)(1),
(2), (4) Date: Nov. 11, 2008

(87) PCT Pub. No.: WO2007/135886
PCT Pub. Date: Nov. 29, 2007

(65) Prior Publication Data
US 2009/0158829 A1    Jun. 25, 2009

(30) Foreign Application Priority Data

May 23, 2006    (JP) .................................. 2006-143317

(51) Int. Cl.
*G01M 15/04* (2006.01)
(52) U.S. Cl. ................. 73/114.02; 73/114.25; 73/114.26
(58) Field of Classification Search ............... 73/114.02, 73/114.04, 114.25, 114.26
See application file for complete search history.

(56) References Cited

U.S. PATENT DOCUMENTS

| | | | | |
|---|---|---|---|---|
| 5,379,634 A * | 1/1995 | Kuroda et al. | ............. | 73/114.04 |
| 5,415,035 A * | 5/1995 | Shimasaki et al. | .......... | 73/114.04 |
| 5,744,722 A * | 4/1998 | Wu et al. | ......................... | 73/659 |
| 5,804,711 A * | 9/1998 | Remboski et al. | .......... | 73/114.05 |
| 5,841,025 A * | 11/1998 | Remboski et al. | .......... | 73/114.05 |
| 5,862,506 A * | 1/1999 | Lynch et al. | ................... | 701/111 |
| 6,885,932 B2 * | 4/2005 | Liu et al. | ....................... | 701/103 |
| 7,158,875 B2 * | 1/2007 | Yasui et al. | .................... | 701/111 |
| 7,383,902 B2 * | 6/2008 | Matsuzaki et al. | ........ | 180/65.285 |
| 7,503,207 B2 * | 3/2009 | Nishigaki et al. | .......... | 73/114.02 |

(Continued)

FOREIGN PATENT DOCUMENTS

JP    05-180064    7/1993
(Continued)

*Primary Examiner* — Freddie Kirkland, III
(74) *Attorney, Agent, or Firm* — Kenyon & Kenyon LLP (57) ABSTRACT

The internal combustion engine system of the invention calculates a time constant of a high pass filter for eliminating a resonance component of a damper as a distortional element from a rotation speed of an engine, and sets the high pass filter with computation of a transfer function from the time constant. The set high pass filter is applied to a 30-degree rotation time representing a rotational variation of the engine to obtain a filtered 30-degree rotation time with elimination of the resonance component of the damper. The occurrence of an engine misfire is detected, based on a 30-degree rotation time difference and a misfire detection base difference computed from the filtered 30-degree rotation times. This arrangement ensures highly-accurate detection of the occurrence of a misfire in the engine constructed to output power via the damper as the distortional element, irrespective of the rotation speed of the engine.

15 Claims, 6 Drawing Sheets

U.S. PATENT DOCUMENTS

| | | | |
|---|---|---|---|
| 7,543,483 B2 * | 6/2009 | Akimoto et al. | 73/114.03 |
| 7,591,172 B2 * | 9/2009 | Lynch et al. | 73/114.05 |
| 7,707,874 B2 * | 5/2010 | Suzuki | 73/114.04 |
| 7,712,356 B2 * | 5/2010 | Suzuki | 73/114.04 |
| 2002/0014113 A1 * | 2/2002 | Takaku et al. | 73/116 |
| 2009/0145210 A1 * | 6/2009 | Suzuki | 73/114.04 |
| 2009/0308145 A1 * | 12/2009 | Suzuki | 73/114.04 |
| 2010/0152991 A1 * | 6/2010 | Suzuki | 701/99 |

FOREIGN PATENT DOCUMENTS

| | | |
|---|---|---|
| JP | 05-332194 | 12/1993 |
| JP | 6-93919 A | 4/1994 |
| JP | 2005-505418 A | 2/2005 |
| WO | WO 03/033411 A1 | 4/2003 |
| WO | WO 2005/017803 A | 2/2005 |

* cited by examiner

INTERNAL COMBUSTION ENGINE SYSTEM AND ENGINE MISFIRE DETECTION METHOD FOR INTERNAL COMBUSTION ENGINE

This is a 371 national phase application of PCT/JP2007/059904 filed 14 May 2007, claiming priority to Japanese Patent Application No. JP 2006-143317 filed 23 May 2006, the contents of which are incorporated herein by reference.

TECHNICAL FIELD

The present invention relates to an internal combustion engine system and an engine misfire detection method for an internal combustion engine. More specifically the invention pertains to an internal combustion engine system including a multi-cylinder internal combustion engine designed to output power to a driveshaft via a distortional element, as well as to an engine misfire detection method of detecting the occurrence of a misfire in an internal combustion engine included in such an internal combustion engine system.

BACKGROUND ART

One proposed technique adopted for an internal combustion engine system applies a high pass filter to detect the occurrence of an engine misfire in the condition of low engine rotation speed, while applying a low pass filter to detect the occurrence of an engine misfire in the condition of high engine rotation speed (see, for example, Patent Document 1) In the condition of the low engine rotation speed, there is a low frequency noise caused by an 'engine swing back' in the process of detecting a rotational variation of a crankshaft. The high pass filter is thus applied for engine misfire detection in the condition of the low engine rotation speed to eliminate the low frequency noise. In the condition of the high engine rotation speed, on the other hand, there is a high frequency noise caused by a distortional vibration or 'rattling' of the crankshaft in the process of detecting the rotational variation of the crankshaft. The low pass filter is thus applied for engine misfire detection in the condition of the high engine rotation speed to eliminate the high frequency noise. The internal combustion engine system of this prior art structure is expected to detect the occurrence of an engine misfire with high accuracy in any range of the rotation speed of the engine.
Patent Document 1: Japanese Patent Laid-Open No. H05-180064

DISCLOSURE OF THE INVENTION

The internal combustion engine system of this prior art structure applies the high pass filter for engine misfire detection in the condition of the low engine rotation speed, while applying the low pass filter for engine misfire detection in the condition of the high engine rotation speed. Multiple different filters are thus required corresponding to the different levels of the rotation speed of the engine.

In an internal combustion engine constructed to output power to a driveshaft via a distortional element, a rotational variation of the crankshaft by the occurrence of an engine misfire causes resonance of the distortional element. Generation of the resonance interferes with accurate detection of the occurrence of an engine misfire based on the rotational variation of the crankshaft.

In the internal combustion engine system and the engine misfire detection method for the internal combustion engine, there would thus be a demand for ensuring highly-accurate detection of the occurrence of a misfire in an internal combustion engine, which is constructed to output power to a driveshaft via a distortional element, irrespective of the rotation speed of the internal combustion engine. In the internal combustion engine system and the engine misfire detection method for the internal combustion engine, there would also be a demand for ensuring highly-accurate detection of the occurrence of a misfire in the internal combustion engine, which is constructed to output power to the driveshaft via the distortional element, according to the rotation speed of the internal combustion engine.

The present invention accomplishes at least part of the demand mentioned above and the other relevant demands by the following configurations applied to the internal combustion engine system and the engine misfire detection method for the internal combustion engine.

According to one aspect, the invention is directed to an internal combustion engine system having a multi-cylinder internal combustion engine constructed to output power to a driveshaft via a distortional element. The internal combustion engine system includes: a rotational position detector configured to detect a rotational position of an output shaft of the internal combustion engine; a rotation speed detector configured to detect a rotation speed of the internal combustion engine; a rotational variation processor configured to compute a rotational variation of the internal combustion engine from the detected rotational position; an influencing component eliminator configured to set a specification of an influencing component elimination process, which is performed to eliminate an influencing component on the rotational variation of the internal combustion engine by resonance of the distortional element, based on the detected rotation speed of the internal combustion engine, and to apply the influencing element elimination process with the set specification to the computed rotational variation, so as to obtain an influencing component-free rotational variation with elimination of the influencing component on the rotational variation of the internal combustion engine by the resonance of the distortional element; and an engine misfire detector configured to detect occurrence of a misfire in the internal combustion engine, based on the influencing component-free rotational variation.

The internal combustion engine system according to this aspect of the invention sets the specification of the influencing component elimination process, which is performed for eliminating the influencing component on the rotational variation of the internal combustion engine by the resonance of the distortional element, based on the rotation speed of the internal combustion engine. The internal combustion engine system subsequently applies the influencing component elimination process with the set specification to the rotational variation, which is computed from the rotational position of the output shaft of the internal combustion engine, so as to obtain the influencing component-free rotational variation with elimination of the influencing component on the rotational variation of the internal combustion engine by the resonance of the distortional element. The internal combustion engine system then detects the occurrence of a misfire in the internal combustion engine, based on the obtained influencing component-free rotational variation. Namely the occurrence of a misfire in the internal combustion engine is detected, based on the influencing component-free rotational variation obtained by application of the influencing component elimination process with the specification set according to the rotation speed of the internal combustion engine. This arrangement effectively ensures the highly-accurate detection of the occurrence of a misfire in the internal combustion engine, which is constructed to output power to the driveshaft via the distortional element, irrespective of the rotation speed of the internal combustion engine, while ensuring the highly-accurate detection of the occurrence of a misfire in the internal combustion engine, which is constructed to output power to the driveshaft via the distortional element, according to the rotation speed of the internal combustion engine. The internal combustion engine system of the invention may be mounted on a vehicle as a driving source.

In one preferable application of the internal combustion engine system according to the above aspect of the invention, the influencing component elimination process applies a high pass filter to the rotational variation to cut off a resonance frequency domain of the distortional element. The specification of the influencing component elimination process is a time constant of the high pass filter. The internal combustion engine system of this application sets the time constant of the high pass filter according to the rotation speed of the internal combustion engine and applies the high pass filter with the set time constant as the influencing component elimination process to obtain the influencing component-free rotational variation. In one preferable embodiment of the internal combustion engine system of this application, the high pass filter may be set to have a cutoff frequency set to be not lower than a specific frequency at a rate of one to two rotations of the output shaft of the internal combustion engine. This is because the frequency of an influence on the rotational variation by a misfire of a single cylinder is equal to the rate of one to two rotations of the output shaft of the internal combustion engine, which is designed to work in a four-stroke cycle of an air intake stroke, a compression stroke, an expansion stroke, and an exhaust stroke.

In another preferable embodiment of the internal combustion engine system of the above application applying the high pass filter as the influencing component elimination process, the influencing component eliminator sets a transfer function of the high pass filter at a sampling cycle, which is set equal to a rotational variation of the internal combustion engine at intervals of a preset rotational angle, based on the detected rotation speed. In the internal combustion engine system of this embodiment, the transfer function may be expressed by Equation (1) and a sampling time and a time constant may be expressed by Equation (2) given below:

$$G = Ts/(Ts+1) \quad (1)$$

$$S/T = \theta \cdot \pi/360 \quad (2)$$

where $\theta$, S, T, s, and G respectively denote the preset rotational angle, the sampling time, the time constant, a Laplace operator, and the transfer function. The 'preset rotational angle' may be, for example, 30 degrees.

In one preferable application of the internal combustion engine system of the above embodiment setting the transfer function of the high pass filter at the sampling cycle set equal to the rotational variation of the internal combustion engine at the intervals of the preset rotational angle and detecting the occurrence of a misfire in the internal combustion engine, in a state of successively obtaining the rotational variation at the intervals of the preset rotational angle, the influencing component eliminator sets the transfer function of the high pass filter at the sampling cycle, which is set equal to the rotational variation of the internal combustion engine at the intervals of the preset rotational angle, based on the detected rotation speed and applies the set high pass filter to the rotational variation to obtain the influencing component-free rotational variation. In a state of not successively obtaining the rotational variation at the intervals of the preset rotational angle but obtaining a rotational variation at an interval of a 2-fold rotational angle that is twice as much as the preset rotational angle, the influencing component eliminator sets the transfer function of the high pass filter at the sampling cycle, which is set equal to the rotational variation at the interval of the 2-fold rotational angle that is twice as much as the preset rotational angle, based on the detected rotation speed and applies the set high pass filter to the rotational variation to obtain the influencing component-free rotational variation. This arrangement ensures the highly-accurate detection of the occurrence of a misfire in the internal combustion engine even in the event of not successively obtaining the rotational variation at the intervals of the preset rotational angle by some reason. In one preferable structure of the internal combustion engine of this application, the rotational position detector detects the rotational position of the output shaft of the internal combustion engine by using a predetermined rotator designed to rotate in synchronism with rotation of the output shaft of the internal combustion engine and to have multiple teeth provided at intervals of a predetermined angle and a tooth-missing space as a reference position. The influencing component eliminator specifies a timing of tooth missing as the state of not successively obtaining the rotational variation at the intervals of the preset rotational angle but obtaining the rotational variation at the interval of the 2-fold rotational angle that is twice as much as the preset rotational angle, and sets the transfer function of the high pass filter at the sampling cycle, which is set equal to the rotational variation at the interval of the 2-fold rotational angle that is twice as much as the preset rotational angle, based on the detected rotation speed. This arrangement ensures the highly-accurate detection of the occurrence of a misfire in the internal combustion engine in the structure of detecting the rotational position of the output shaft of the internal combustion engine based on the position of the tooth-missing space.

In the internal combustion engine system of the present invention, the rotational position detector may detect the rotational position of the output shaft of the internal combustion engine by using a predetermined rotator designed to rotate in synchronism with rotation of the output shaft of the internal combustion engine and to have multiple teeth provided at intervals of a predetermined angle and a tooth-missing space as a reference position, and the engine misfire detector may detect the occurrence of a misfire in the internal combustion engine, based on a rotational variation at a tooth missing influence-free rotational position relative to a top dead center in a compression stroke of each of the multiple cylinders of the internal combustion engine, which is included in the influencing component-free rotational variation. This arrangement prevents misdetection of the occurrence of a misfire due to tooth-missing space.

In the internal combustion engine system of the present invention, the rotational variation processor may compute a unit rotational angle rotation time, which represents a time period required for rotating the output shaft of the internal combustion engine by a preset unit rotational angle in response to every rotation of the output shaft by the preset unit rotational angle, as the rotational variation of the internal combustion engine.

In the internal combustion engine system of the present invention, the internal combustion engine system may further has: an electric power-mechanical power input output assembly connected with the output shaft of the internal combustion engine via the distortional element and with the driveshaft and configured to input and output power from and to the output shaft and the driveshaft through input and output of electric power and mechanical power. In this case, the electric power-mechanical power input output assembly may include:

a three shaft-type power input output structure connected with three shafts, the output shaft of the internal combustion engine, the driveshaft, and a rotating shaft and configured to input and output power to and from a residual shaft based on powers input to and output from any two shafts among the three shafts; and a motor constructed to input and output power from and to the rotating shaft.

According to another aspect, the invention is directed to an engine misfire detection method of detecting occurrence of a misfire in a multi-cylinder internal combustion engine, which is included in an internal combustion engine system and is constructed to output power to a driveshaft via a distortional element, the engine misfire detection method including: computing a rotational variation of the internal combustion engine from a rotational position of the output shaft of the internal combustion engine; setting a specification of an influencing component elimination process, which is performed to eliminate an influencing component on the rotational variation of the internal combustion engine by resonance of the distortional element, based on a rotation speed of the internal combustion engine; applying the influencing element elimination process with the set specification to the computed rotational variation, so as to obtain an influencing component-free rotational variation with elimination of the influencing component on the rotational variation of the internal combustion engine by the resonance of the distortional element; and detecting occurrence of a misfire in the internal combustion engine, based on the influencing component-free rotational variation.

The engine misfire detection method according to this aspect of the invention sets the specification of the influencing component elimination process, which is performed for eliminating the influencing component on the rotational variation of the internal combustion engine by the resonance of the distortional element, based on the rotation speed of the internal combustion engine. The engine misfire detection method subsequently applies the influencing component elimination process with the set specification to the rotational variation, which is computed from the rotational position of the output shaft of the internal combustion engine, so as to obtain the influencing component-free rotational variation with elimination of the influencing component on the rotational variation of the internal combustion engine by the resonance of the distortional element. The method then detects the occurrence of a misfire in the internal combustion engine, based on the obtained influencing component-free rotational variation. Namely the occurrence of a misfire in the internal combustion engine is detected, based on the influencing component-free rotational variation obtained by application of the influencing component elimination process with the specification set according to the rotation speed of the internal combustion engine. This arrangement effectively ensures the highly-accurate detection of the occurrence of a misfire in the internal combustion engine, which is constructed to output power to the driveshaft via the distortional element, irrespective of the rotation speed of the internal combustion engine, while ensuring the highly-accurate detection of the occurrence of a misfire in the internal combustion engine, which is constructed to output power to the driveshaft via the distortional element, according to the rotation speed of the internal combustion engine.

In one preferable application of the engine misfire detection method according to the above aspect of the invention, the influencing component elimination process applies a high pass filter to the rotational variation to cut off a resonance frequency domain of the distortional element, and the specification of the influencing component elimination process is a time constant of the high pass filter. The engine misfire detection method of this application sets the time constant of the high pass filter according to the rotation speed of the internal combustion engine and applies the high pass filter with the set time constant as the influencing component elimination process to obtain the influencing component-free rotational variation.

In one preferable embodiment of the engine misfire detection method of the above application applying a high pass filter as the influence component elimination process, the engine misfire detection method sets a transfer function of the high pass filter at a sampling cycle, which is set equal to a rotational variation of the internal combustion engine at intervals of a preset rotational angle, based on the detected rotation speed, applies the high pass filter with the set transfer function to the rotational variation as the influencing component elimination process to obtain the influencing component-free rotational variation, and detects the occurrence of a misfire in the internal combustion engine based on the influencing component-free rotational variation. In one structure of this embodiment, in a state of successively obtaining the rotational variation at the intervals of the preset rotational angle, the engine misfire detection method sets the transfer function of the high pass filter at the sampling cycle, which is set equal to the rotational variation of the internal combustion engine at the intervals of the preset rotational angle, based on the detected rotation speed, applies the set high pass filter to the rotational variation to obtain the influencing component-free rotational variation, and detects the occurrence of a misfire in the internal combustion engine based on the influencing component-free rotational variation. In a state of not successively obtaining the rotational variation at the intervals of the preset rotational angle but obtaining a rotational variation at an interval of a 2-fold rotational angle that is twice as much as the preset rotational angle, the engine misfire detection method sets the transfer function of the high pass filter at the sampling cycle, which is set equal to the rotational variation at the interval of the 2-fold rotational angle that is twice as much as the preset rotational angle, based on the detected rotation speed, applies the set high pass filter to the rotational variation to obtain the influencing component-free rotational variation, and detects the occurrence of a misfire in the internal combustion engine based on the influencing component-free rotational variation. This arrangement ensures the highly-accurate detection of the occurrence of a misfire in the internal combustion engine even in the event of not successively obtaining the rotational variation at the intervals of the preset rotational angle by some reason. In this case, the engine misfire detection method may compute the rotation speed of the internal combustion engine from the rotational position of the output shaft of the internal combustion engine, which is obtained by using a predetermined rotator designed to rotate in synchronism with rotation of the output shaft of the internal combustion engine and to have multiple teeth provided at intervals of a predetermined angle and a tooth-missing space as a reference position, specifies a timing of tooth missing as the state of not successively obtaining the rotational variation at the intervals of the preset rotational angle but obtaining the rotational variation at the interval of the 2-fold rotational angle that is twice as much as the preset rotational angle, sets the transfer function of the high pass filter at the sampling cycle, which is set equal to the rotational variation at the interval of the 2-fold rotational angle that is twice as much as the preset rotational angle, based on the detected rotation speed, applying the set high pass filter to the rotational variation to obtain the influencing component-free rotational variation, and detects the occurrence of a misfire in the internal combustion engine based on the influencing component-free rotational variation. This arrangement ensures the highly-accurate detection of the occurrence of a misfire in the internal combustion engine in the structure of detecting the rotational position of the output shaft of the internal combustion engine based on the position of the tooth-missing space.

In the engine misfire detection method of the invention, the method may compute the rotation speed of the internal combustion engine from the rotational position of the output shaft of the internal combustion engine, which is obtained by using a predetermined rotator designed to rotate in synchronism with rotation of the output shaft of the internal combustion engine and to have multiple teeth provided at intervals of a predetermined angle and a tooth-missing space as a reference position, and detects the occurrence of a misfire in the internal combustion engine, based on a rotational variation at a tooth missing influence-free rotational position relative to a top dead center in a compression stroke of each of the multiple cylinders of the internal combustion engine, which is included in the influencing component-free rotational variation. This arrangement prevents misdetection of the occurrence of a misfire due to tooth-missing space.

BRIEF DESCRIPTION OF THE DRAWINGS

FIG. 3 shows one example of a timing rotor 140a;

BEST MODES OF CARRYING OUT THE INVENTION

Figure 1:
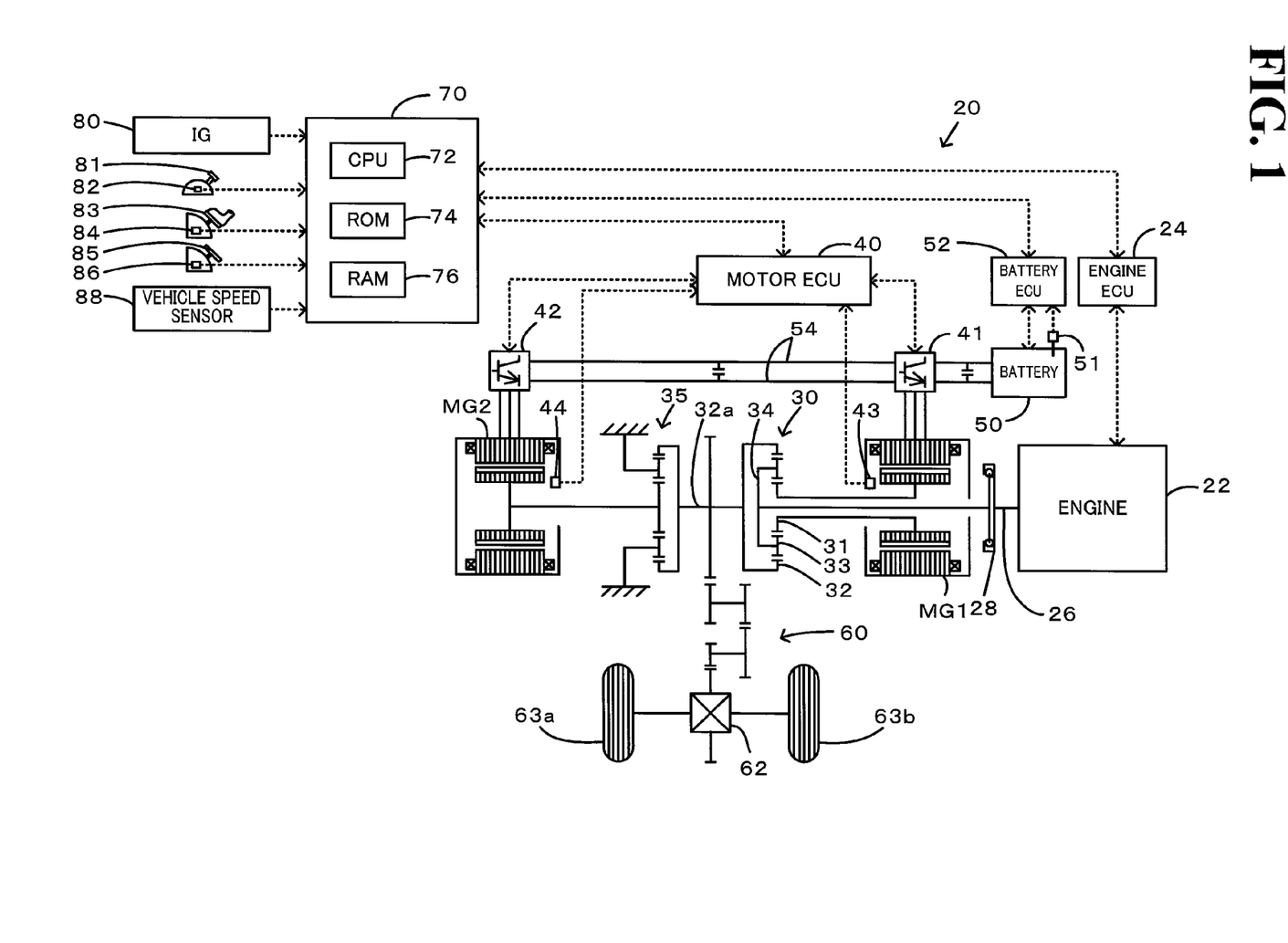
FIG. 1 schematically illustrates the configuration of a hybrid vehicle 20 in one embodiment of the invention.

One mode of carrying out the invention is described below as a preferred embodiment with reference to the accompanied drawings. FIG. 1 schematically illustrates the configuration of a hybrid vehicle 20 equipped with an internal combustion engine system in one embodiment of the invention. As illustrated, the hybrid vehicle 20 of the embodiment has an engine 22, a three shaft-type power distribution integration mechanism 30 connected to an output shaft of the engine 22 or a crankshaft 26 via a damper 28 as a distortional element, a motor MG1 connected with the power distribution integration mechanism 30 and designed to have power generation capability, a reduction gear 35 attached to a ring gear shaft 32a or a driveshaft linked with the power distribution integration mechanism 30, a motor MG2 connected with the reduction gear 35, and a hybrid electronic control unit 70 configured to control the operations of the whole hybrid vehicle 20. In the structure of the embodiment, the primary components of the internal combustion engine system include the engine 22, the power distribution integration mechanism 30 connected with the engine 22 via the damper 28, the motor MG1, and an engine electronic control unit 24 designed to control the operations of the engine 22.

Figure 2:
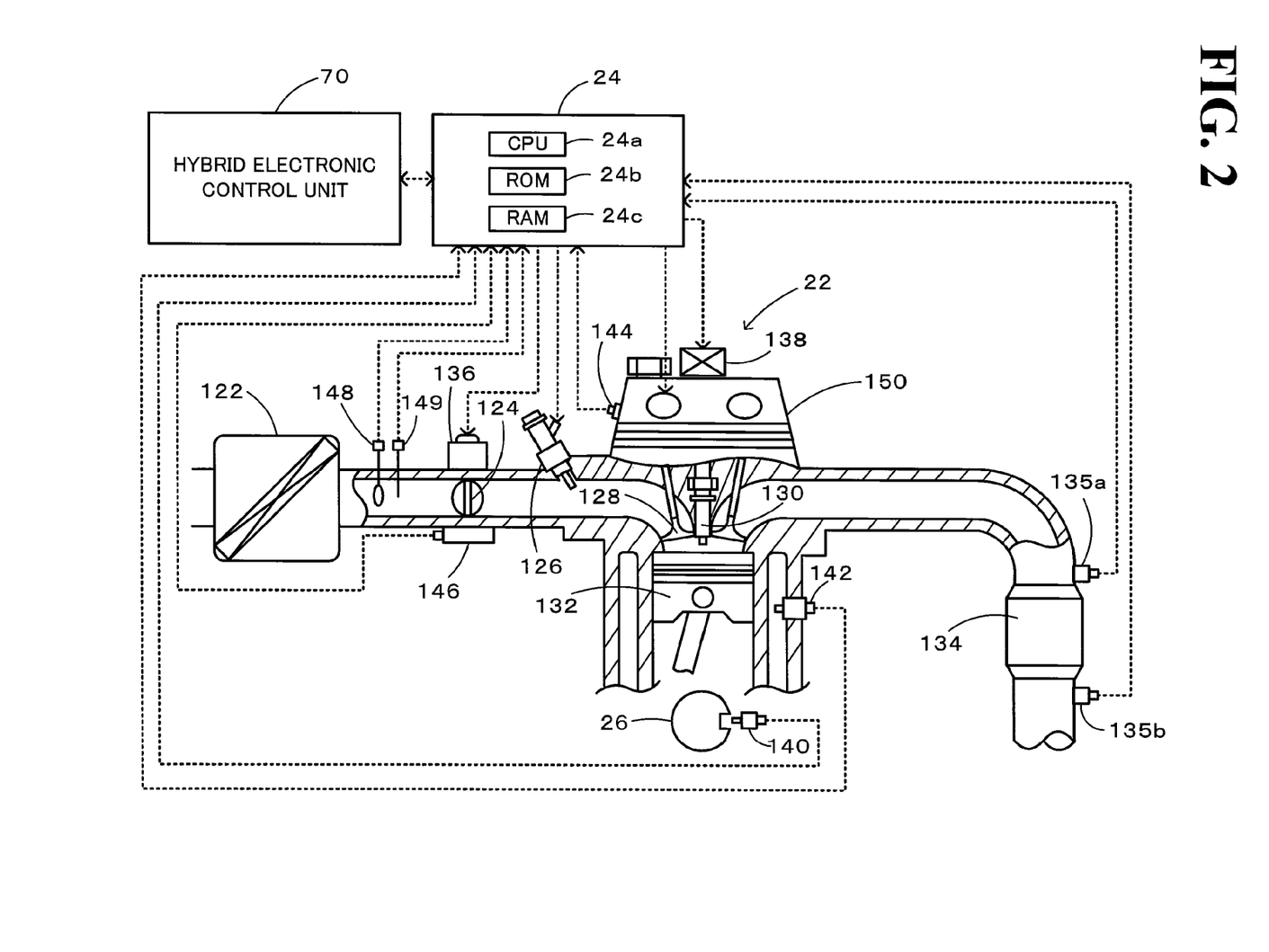
FIG. 2 schematically illustrates the configuration of an engine 22.

The engine 22 is constructed as a six-cylinder internal combustion engine designed to consume a hydrocarbon fuel, such as gasoline or light oil, and thereby generate power. As shown in FIG. 2, the air cleaned by an air cleaner 122 and taken in via a throttle valve 124 is mixed with the atomized fuel injected from a fuel injection valve 126 provided for each of the six cylinders to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air.

Figure 3:
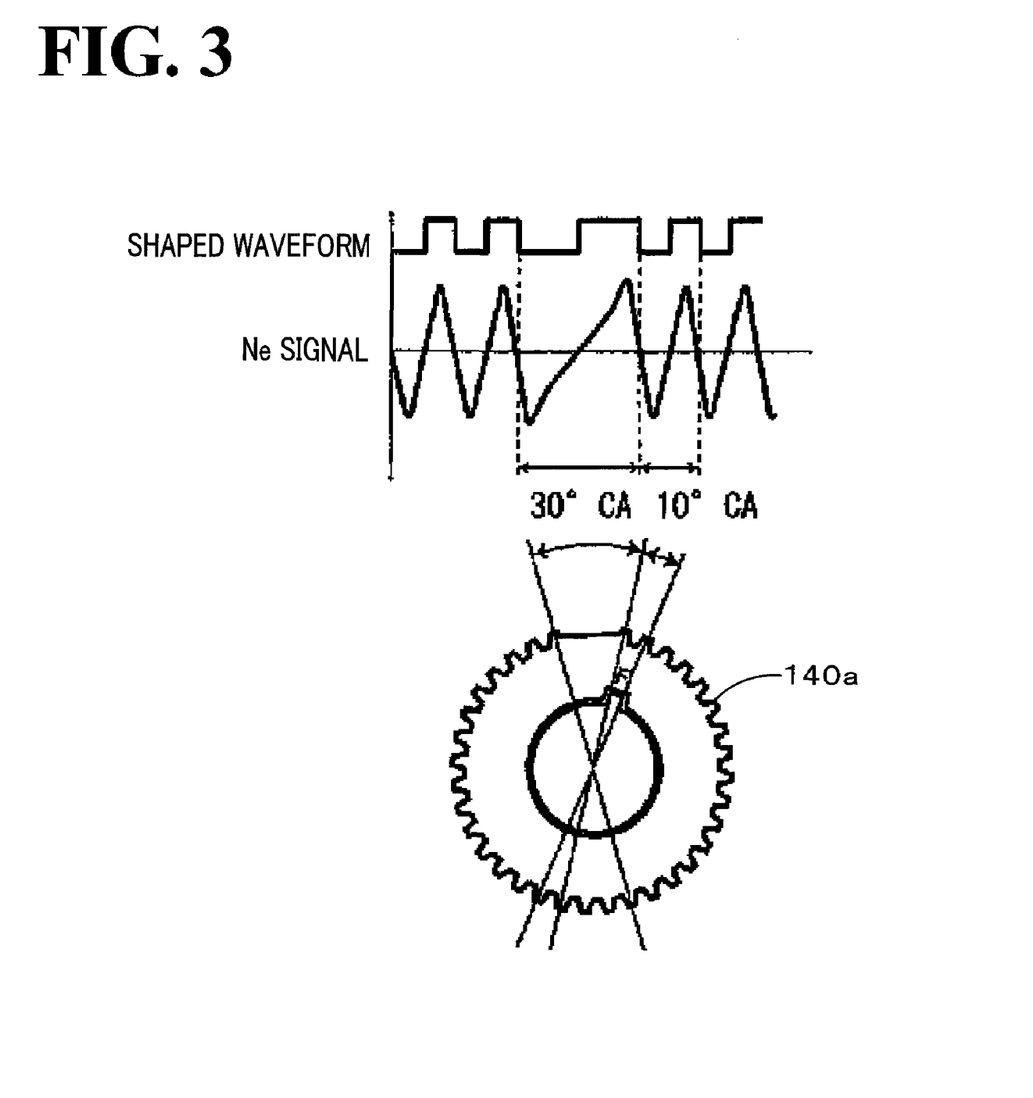

The engine 22 is under control of the engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank angle CA or a crank position from a crank position sensor 140 detected as the rotational position of the crankshaft 26, a cooling water temperature from a water temperature sensor 142 measured as the temperature of cooling water in the engine 22, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal AF from an air flow meter 148 located in an air intake conduit, an intake air temperature from a temperature sensor 149 located in the air intake conduit, an air-fuel ratio from an air fuel ratio sensor 135a, and an oxygen signal from an oxygen sensor 135b. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The crank position sensor 140 is constructed as an electromagnetic pickup sensor having a timing rotor 140a. As shown in FIG. 3, the timing rotor 140a is attached to the crankshaft 26 to be rotated in synchronism with rotation of the crankshaft 26 and is designed to have teeth arranged at 10-degree intervals and two tooth-missing spaces corresponding to two teeth for specifying a reference position. A shaped waveform is generated in response to each 10-degree rotation of the crankshaft 26. The tooth-missing spaces in the timing rotor 140a are arranged at positions of 30 degrees before respective top dead centers (BTDC30) in compression strokes of a $2^{nd}$ cylinder and a $5^{th}$ cylinder in an ignition sequence.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
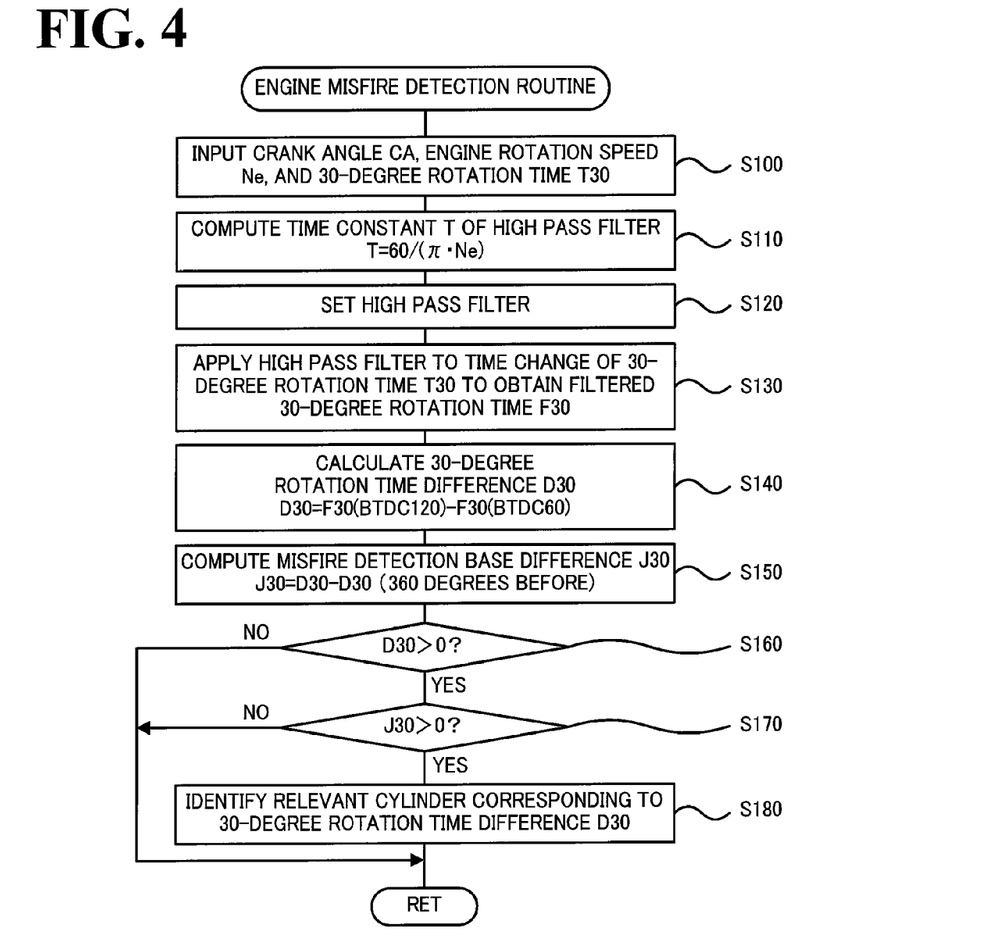
FIG. 4 is a flowchart showing an engine misfire detection routine executed by the engine ECU 24.

The description regards a series of processing to detect the occurrence of an engine misfire and identify a misfired cylinder in the engine 22 mounted on the hybrid vehicle 20 of the embodiment having the configuration discussed above. FIG. 4 is a flowchart showing an engine misfire detection routine executed by the engine ECU 24. This engine misfire detection routine is performed repeatedly at preset time intervals.

Figure 5:
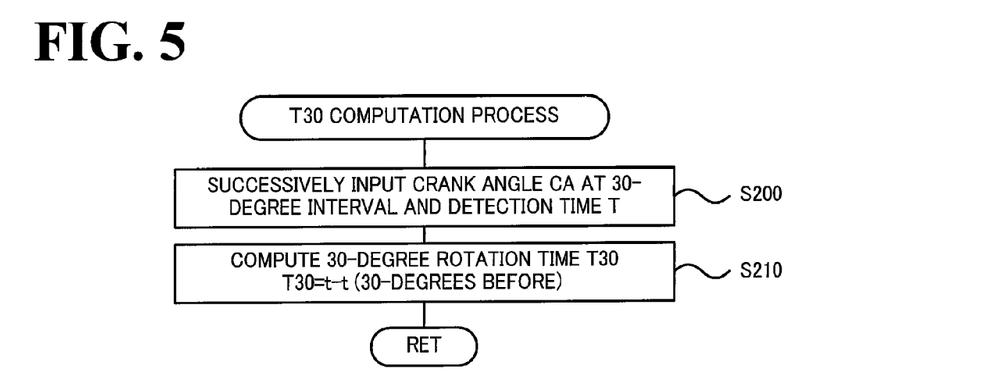
FIG. 5 is a flowchart showing a T30 computation process.

In the engine misfire detection routine, the CPU 24a of the engine ECU 24 first inputs the crank angle CA detected by the crank position sensor 140, a rotation speed Ne of the engine 22, a 30-degree rotation time T30 computed as a time period required for a 30-degree rotation of the crankshaft 26 according to a T30 computation process shown in the flowchart of FIG. 5 (step S100). The rotation speed Ne of the engine 22 is computed from the crank angle CA detected by the crank position sensor 140. The T30 computation process of FIG. 5 successively inputs the crank angle CA shifted from a reference crank angle by every 30 degrees and a detection time t of the crank angle CA (step S200) and calculates a difference between the input detection time t of the current crank angle CA and the input detection time t of the previous crank angle CA of 30 degrees before as the 30-degree rotation time T30 (step S210). A reciprocal of the 30-degree rotation time T30 represents a rotation speed of the engine 22 at the time of every 30-degree rotation of the crankshaft 26 (hereafter referred to as 30-degree rotation speed N30). The 30-degree rotation time T30 accordingly shows the degree of a change of the 30-degree rotation speed N30, that is, a rotational variation in the unit of time.

A time constant T of a high pass filter applied to a time change of the 30-degree rotation time T30 to eliminate a resonance component of the damper 28 is computed from the input rotation speed Ne of the engine 22 according to Equation (1) given below (step S110). The computed time constant T is substituted in Equation (2) given below to set a transfer function G of the high pass filter (step S120) In Equation (2), 's' represents a Laplace operator.

$$T = 60/(\pi \cdot Ne) \quad (1)$$

$$G(s) = Ts/(Ts+1) \quad (2)$$

Figure 6:
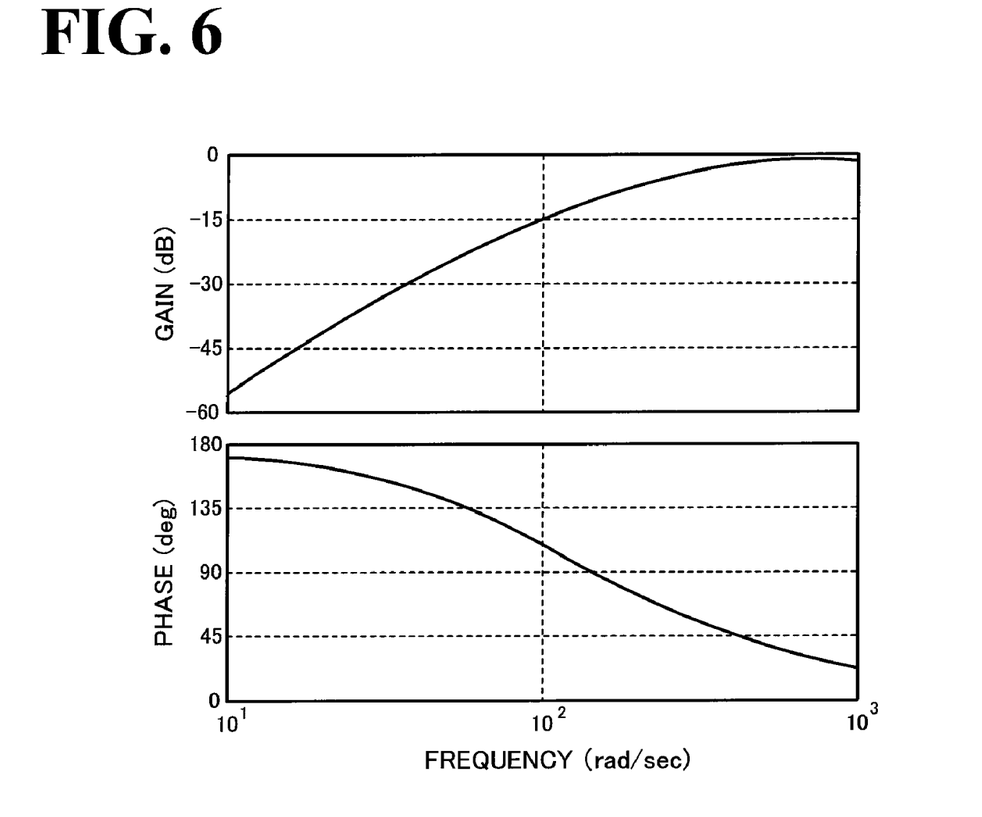
FIG. 6 shows one example of a Bode diagram of the high pass filter.

The time constant T of the high pass filter is obtained by Equation (1) given above, because of the following reason. Transform of the transfer function G of the high pass filter into a time domain gives equations of state in continuous time as Equations (3) and (4) below. In Equations (3) and (4), 'x', 'y', and 'u' respectively denote a state variable, a target signal to be extracted, and an input. Discrete time conversion of these equations of state with a sampling time S gives recurrence equations as Equations (5) and (6) below. In Equations (5) and (6), 'k' denotes a step in discrete time. On the assumption that one of the multiple cylinders in the engine 22 is misfired, the engine misfire appears at a rate of one to two rotations of the crankshaft 26 of the engine 22. Namely a frequency f1 of engine misfire is expressed as f1=(Ne/60)/2. Setting a cutoff frequency of the high pass filter to the frequency f1 of engine misfire makes the time constant T of the high pass filter expressed as T=1/(f1·2π). Substitution of the frequency f1 of engine misfire into this expression gives Equation (7) below. When a sampling cycle in a discrete system is set to a timing of rotating the crankshaft 26 by θ degrees, the sampling time S is expressed by Equation (8) below. Computation of the sampling time S/time constant T according to Equations (7) and (8) gives Equation (9). Elimination of the sampling time S from Equation (9) by substitution of Equation (8) gives Equation (1). As clearly understood from Equation (1), when the sampling time is set corresponding to a rotational angle of the crankshaft 26, the time constant T depends upon the rotation speed Ne of the engine 22 irrespective of the sampling time. FIG. 6 shows one example of a Bode diagram of the high pass filter obtained as discussed above. In the illustrated example, the sampling cycle is set to a timing of rotating the crankshaft 26 by 30 degrees (θ=30).

$$\dot{x} = -\frac{1}{T}x - \frac{1}{T}u \quad (3)$$

$$y = x + u \quad (4)$$

$$x[k+1] = \exp(-S/T) \cdot x[k] + \{\exp(-S/T - 1)\} \cdot u[k] \quad (5)$$

$$y[k] = x[k] + u[k] \quad (6)$$

$$T = 1/\{(Ne/60)/2 \cdot 2\pi\} \quad (7)$$

$$S = 1/\{(Ne/60) \cdot (360/\theta)\} \quad (8)$$

$$S/T = \pi \cdot \theta/360 \quad (9)$$

After setting the high pass filter, the CPU 24a applies the set high pass filter to a time change of the input 30-degree rotation time T30 to obtain a filtered 30-degree rotation time F30 with elimination of the resonance component of the damper 28 (step S130). A difference [F30(BTDC120)−F30 (BTDC60)] between the filtered 30-degree rotation time F30 of 120 degrees before the top dead center (BTDC120) and the filtered 30-degree rotation time F30 of 60 degrees before the top dead center (BTDC60) in the compression stroke of each cylinder is computed as a 30-degree rotation time difference D30 (step S140). A 360-degree difference [D30−D30 (360 degrees before)] of the computed 30-degree rotation time differences D30 is calculated as a misfire detection base difference J30 (step S150). The CPU 24a then determines whether both the computed 30-degree rotation time difference D30 and the computed misfire detection base difference J30 are positive values (steps S160 and S170). The 30-degree rotation time difference D30 is computed as the difference between the filtered 30-degree rotation time F30 of 120 degrees before the top dead center (BTDC120) and the filtered 30-degree rotation time F30 of 60 degrees before the top dead center (BTDC60) in the compression stroke of each cylinder with avoidance of the positions of the tooth-missing spaces in the timing rotor 140a or the positions of 30 degrees before the top dead centers (BTDC30) in the compression strokes of the $2^{nd}$ cylinder and the $5^{th}$ cylinder in the ignition sequence. Such computation eliminates the influence of the missing teeth in the timing rotor 140a from the 30-degree rotation time difference D30. Based on the degree of acceleration of the piston 132 by combustion (explosion) in the engine 22, the 30-degree rotation time difference D30 has a negative value in a normal combustion (explosion) condition of a cylinder and has a positive value in a misfiled condition of the cylinder. The misfire detection base difference J30 is given as a difference between the 30-degree rotation time difference D30 of a misfired cylinder and the 30-degree rotation time difference D30 of a normally fired cylinder and thus always has a positive value. An engine misfire is detected when both the 30-degree rotation time difference D30 and the misfire detection base difference J30 are positive values. On condition that both the 30-degree rotation time difference D30 and the misfire detection base difference J30 are positive values, the engine misfire detection routine of this embodiment identifies a relevant cylinder (corresponding to the 30-degree rotation time difference D30) as a misfired cylinder (step S180) and is then terminated. On condition that both or one of the 30-degree rotation time difference D30 and the misfire detection base difference J30 is a negative value, on the other hand, the engine misfire detection routine of this embodiment determines no occurrence of an engine misfire and is then terminated.

As described above, in the internal combustion engine system mounted on the hybrid vehicle 20 of the embodiment, the high pass filter used for eliminating the resonance component of the damper 28 is set according to the rotation speed Ne of the engine 22 and is applied to the 30-degree rotation time T30 representing a rotational variation of the engine 22 to obtain the filtered 30-degree rotation time F30 with elimination of the resonance component of the damper 28. The engine misfire is detected, based on the filtered 30-degree rotation time F30. Even in the event of a distortional resonance of the damper 28, this arrangement ensures detection of a misfire of the engine 22 with high accuracy and with high reliability, based on the rotation speed Ne of the engine 22 or irrespective of the rotation speed Ne of the engine 22. The internal combustion engine system computes the 30-degree rotation time difference D30 with avoidance of the positions of the tooth-missing spaces in the timing rotor 140a, and subsequently computes the misfire detection base difference J30 from the computed 30-degree rotation time differences D30. An engine misfire is detected based on the computed 30-degree rotation time difference D30 and the computed misfire detection base difference J30. This arrangement effectively reduces the potential for false detection of an engine misfire based on the missing teeth in the timing rotor 140a.

In the internal combustion engine system mounted on the hybrid vehicle 20 of the embodiment, the frequency f1 of engine misfire is set to the cutoff frequency of the high pass filter applied to eliminate the resonance component of the damper 28. As long as the resonance component at the frequency f1 of engine misfire is eliminable, the cutoff frequency is not restricted to the frequency f1 of engine misfire but may be a higher frequency than the frequency f1 of engine misfire. For example, the cutoff frequency may be set to a value $c \cdot (Ne/60)/2$, where 'c' denotes a coefficient of greater than the value 1 but of smaller than the value 2. In this modified arrangement, the time constant T is determinable according to the rotation speed Ne of the engine 22.

The internal combustion engine system mounted on the hybrid vehicle 20 of the embodiment calculates the time constant T of the high pass filter used for eliminating the resonance component of the damper 28 from the rotation speed Ne of the engine 22 and computes the transfer function G of the high pass filter from the calculated time constant T to set the high pass filter. One modification may directly compute the transfer function G from the rotation speed Ne of the engine 22. Another modification may calculate the sampling time S from the rotation speed Ne of the engine 22, calculate the time constant T from the sampling time S, and compute the transfer function G from the calculated time constant T.

In the internal combustion engine system mounted on the hybrid vehicle 20 of the embodiment, the tooth-missing spaces in the timing rotor 140a of the crank position sensor 140 are arranged at the positions of 30 degrees before the top dead centers (BTDC30) in the compression strokes of the $2^{nd}$ cylinder and the $5^{th}$ cylinder in the ignition sequence. This positioning is, however, neither essential nor restrictive but the tooth-missing spaces may be arranged at any other suitable positions. The 30-degree rotation time difference D30 and the misfire detection base difference J30 should be calculated with avoidance of the positions of the tooth-missing spaces in the timing rotor 140a.

The internal combustion engine system mounted on the hybrid vehicle 20 of the embodiment applies the high pass filter to a time change of the 30-degree rotation time T30 to obtain the filtered 30-degree rotation time F30 with elimination of the resonance component of the damper 28. With a view to avoiding the positions of the tooth-missing spaces in the timing rotor 140a, the difference [F30(BTDC120)−F30(BTDC60)] between the filtered 30-degree rotation time F30 of 120 degrees before the top dead center (BTDC120) and the filtered 30-degree rotation time F30 of 60 degrees before the top dead center (BTDC60) in the compression stroke of each cylinder is computed as the 30-degree rotation time difference D30. The procedure then calculates the misfire detection base difference J30 from the current and the previous 30-degree rotation time differences D30, and detects the occurrence of an engine misfire based on the 30-degree rotation time difference D30 and the misfire detection base difference J30. As long as the influence of the missing teeth in the timing rotor 140a is eliminable, the 30-degree rotation time difference D30 is not restricted to the difference [F30(BTDC120)−F30(BTDC60)] between the filtered 30-degree rotation time F30 of 120 degrees before the top dead center (BTDC120) and the filtered 30-degree rotation time F30 of 60 degrees before the top dead center (BTDC60) in the compression stroke of each cylinder. A difference between filtered 30-degree rotation times F30 of any angles before the top dead center, for example, a difference F30(BTDC150)−F30(BTDC90)] between the filtered 30-degree rotation time F30 of 150 degrees before the top dead center (BTDC150) and the filtered 30-degree rotation time F30 of 90 degrees before the top dead center (BTDC90) in the compression stroke of each cylinder, may be computed as the 30-degree rotation time difference D30. As long as the occurrence of an engine misfire is detectable with eliminating the influence of the missing teeth in the timing rotor 140a, the detection of an engine misfire may be based on any suitable values other than the 30-degree rotation time difference D30 and the misfire detection base difference J30.

The internal combustion engine system mounted on the hybrid vehicle 20 of the embodiment computes the 30-degree rotation time difference D30 with avoidance of the positions of the tooth-missing spaces in the timing rotor 140a, calculates the misfire detection base difference J30 from the current and the previous 30-degree rotation time differences D30, and detects the occurrence of an engine misfire based on the 30-degree rotation time difference D30 and the misfire detection base difference J30. One modified procedure may compute the 30-degree rotation time difference D30 corresponding to the positions of the tooth-missing spaces in the timing rotor 140a, calculate the misfire detection base difference J30 from the current and the previous 30-degree rotation time differences D30, and detect the occurrence of an engine misfire based on the 30-degree rotation time difference D30 and the misfire detection base difference J30. In this modified arrangement, a high pass filter set corresponding to a sampling cycle equal to a timing of rotating the crankshaft 26 by 20 degrees may be applied for correction to the timing of tooth missing in the timing rotor 140a. The sampling time S/time constant T is then expressed as Equation (10) given below by substituting θ with 2θ in Equation (9). As mentioned above, the time constant T depends upon the rotation speed Ne of the engine 22 irrespective of the sampling time. The time constant T is thus expressed by Equation (1) given above. The 30-degree rotation time difference D30 may be calculated as a difference [F30(BTDC90)−F30(BTDC30)] between the filtered 30-degree rotation time F30 of 90 degrees before the top dead center (BTDC90) and the filtered 30-degree rotation time F30 of 30 degrees before the top dead center (BTDC30) in the compression stroke of each cylinder. The misfire detection base difference J30 may be calculated as a 360-degree difference [D30−D30 (360 degrees before)] of the 30-degree rotation time differences D30. In this modified arrangement, the high pass filter set corresponding to the sampling cycle equal to the timing of rotating the crankshaft 26 by θ degrees is applied for correction at the positions other than the positions of 30 degrees before the top dead centers (BTDC30) in the compression strokes of the $2^{nd}$ cylinder and the $5^{th}$ cylinder in the ignition sequence. The high pass filter set corresponding to the sampling cycle equal to the timing of rotating the crankshaft 26 by 2θ is applied for correction, on the other hand, at the positions of 30 degrees before the top dead centers (BTDC30) in the compression strokes of the $2^{nd}$ cylinder and the $5^{th}$ cylinder in the ignition sequence.

$$S/T = \pi \cdot \theta / 180 \quad (10)$$

The internal combustion engine system mounted on the hybrid vehicle 20 of the embodiment computes the 30-degree rotation time difference D30 with avoidance of the positions of the tooth-missing spaces in the timing rotor 140a, calculates the misfire detection base difference J30 from the current and the previous 30-degree rotation time differences D30, and detects the occurrence of an engine misfire based on the 30-degree rotation time difference D30 and the misfire detection base difference J30. In one modified structure, the crank position sensor may be designed to specify the reference position without using the positions of the tooth-missing spaces. In this case, it is not required to calculate the 30-degree rotation time difference D30 and the misfire detection base difference J30 with avoidance of the positions of the tooth-missing spaces. The 30-degree rotation time difference D30 and the misfire detection base difference J30 may be calculated from the filtered 30-degree rotation times F30 at various crank angles CA. As in the modified example discussed above, the difference [F30(BTDC90)–F30(BTDC30)] between the filtered 30-degree rotation time F30 of 90 degrees before the top dead center (BTDC90) and the filtered 30-degree rotation time F30 of 30 degrees before the top dead center (BTDC30) in the compression stroke of each cylinder may be computed as the 30-degree rotation time difference D30. The misfire detection base difference J30 may be calculated as the 360-degree difference [D30–D30 (360 degrees before)] of the 30-degree rotation time differences D30.

The internal combustion engine system mounted on the hybrid vehicle 20 of the embodiment applies the high pass filter for eliminating the resonance component of the damper 28 to a time change of the 30-degree rotation time T30 as the time period required for rotating the crankshaft 26 by 30 degrees to obtain the filtered 30-degree rotation time F30. The occurrence of an engine misfire is detected, based on the 30-degree rotation time difference D30 and the misfire detection base difference J30 calculated from the filtered 30-degree rotation times F30. The 30-degree rotation time T30 is the reciprocal of the 30-degree rotation speed N30 as the rotation speed of the crankshaft 26 at every 30-degree interval. One modified procedure may apply the high pass filter to a time change of the 30-degree rotation speed N30 to obtain a filtered 30-degree rotation speed FN30, calculate a 30-degree rotation speed difference DN30 as a difference between the filtered 30-degree rotation speed FN30 of 120 degrees before the top dead center and the filtered 30-degree rotation speed FN30 of 60 degrees before the top dead center in the compression stroke of each cylinder, compute a misfire detection base rotation speed difference JN30 as a 360-degree difference between the current 30-degree rotation speed difference DN30 and the previous 30-degree rotation speed difference DN30 (360 degrees before), and detect the occurrence of an engine misfire based on the 30-degree rotation speed difference DN30 and the misfire detection base rotation speed difference JN30.

The internal combustion engine system mounted on the hybrid vehicle 20 of the embodiment detects the occurrence of a misfire in the engine 22 on the basis of the 30-degree rotation time T30 as the time period required for rotating the crankshaft 26 by 30 degrees. The occurrence of a misfire in the engine 22 may, however, be detected on the basis of any of various angle rotation times, for example, a 5-degree rotation time T5 as a time period required for rotating the crankshaft 26 by 5 degrees or a 10-degree rotation time T10 as a time period required for rotating the crankshaft 26 by 10 degrees. The occurrence of a misfire in the engine 22 may otherwise be detected on the basis of any of various rotation speeds, for example, a 5-degree rotation speed N5 as a rotation speed of the crankshaft 26 at every 5-degree interval or a 10-degree rotation speed N10 as a rotation speed of the crankshaft 26 at every 10-degree interval.

The internal combustion engine system mounted on the hybrid vehicle 20 of the embodiment detects the occurrence of a misfire in the six-cylinder engine 22. Engine misfire detection is, however, not restricted to the six-cylinder engine, but the internal combustion engine system may be designed to detect the occurrence of a misfire in any multiple-cylinder engine, for example, a four-cylinder engine or an eight-cylinder engine.

Figure 7:
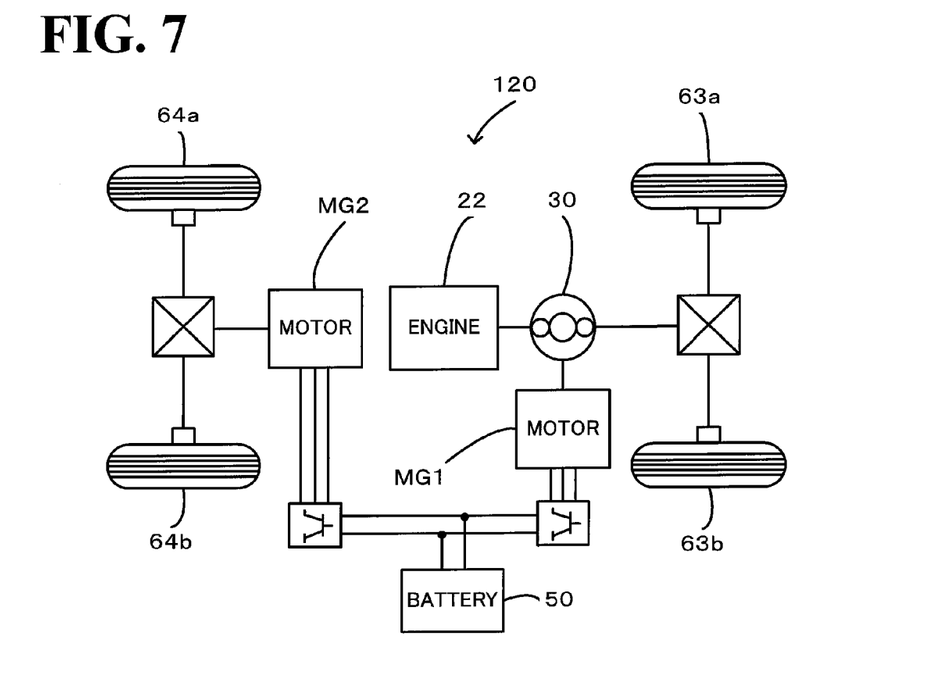
FIG. 7 schematically illustrates the configuration of a hybrid vehicle 120 in one modified structure.
Figure 8:
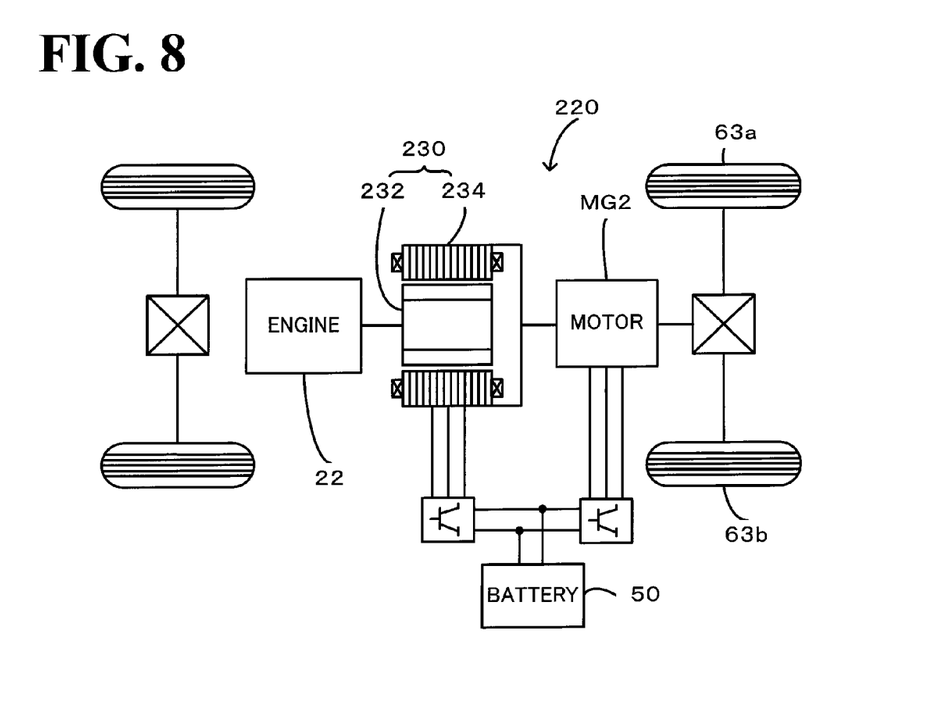
FIG. 8 schematically illustrates the configuration of a hybrid vehicle in another modified structure.

The internal combustion engine system mounted on the hybrid vehicle 20 of the embodiment is constructed to detect the occurrence of a misfire of the engine 22 and includes the power distribution integration mechanism 30 connected with the crankshaft 26 of the engine 22 via the damper 28 as the distortional element and connected with the rotating shaft of the motor MG1 and the ring gear shaft 32a as the driveshaft, and the motor MG2 connected with the ring gear shaft 32a via the reduction gear 35. This configuration is, however, neither restrictive nor essential, but the internal combustion engine system of the invention may be applied to any other configuration where a crankshaft of an engine is connected to a downstream structure via a damper as a distortional element. For example, the internal combustion engine system of the invention may be adopted in a hybrid vehicle 120 of one modified structure shown in FIG. 7 to detect the occurrence of a misfire of the engine 22. In the hybrid vehicle 120 of FIG. 7, the power of the motor MG2 is output to another axle (axle linked with wheels 64a and 64b) that is different from the axle connecting with the ring gear shaft 32a (axle linked with the drive wheels 63a and 63b). In another example, the internal combustion engine system of the invention may be adopted in a hybrid vehicle 220 of another modified structure shown in FIG. 8 to detect the occurrence of a misfire of the engine 22. The hybrid vehicle 220 of FIG. 8 is equipped with a pair-rotor motor 230. The pair-rotor motor 230 includes an inner rotor 232 connected to the crankshaft 26 of the engine 22 via the damper 28 and an outer rotor 234 connected to the drive shaft arranged to output power to the drive wheels 63a and 63b. The pair-rotor motor 230 transmits part of the output power of the engine 22 to the driveshaft, while converting the residual engine output power into electric power.

The technique of the invention is not restricted to the internal combustion engine system mounted on the hybrid vehicle but may be actualized by any of other diverse applications, for example, an internal combustion engine system for an internal combustion engine mounted on a motor vehicle or another moving body or for an internal combustion engine incorporated in a construction machine or another stationary equipment, as well as an engine misfire detection method for the internal combustion engine.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable to the manufacturing industry of the internal combustion engine systems and automobiles equipped with them.

The invention claimed is:

1. An internal combustion engine system having a multi-cylinder internal combustion engine constructed to output power to a driveshaft via a distortional element, the internal combustion engine system comprising:
a rotational position detector configured to detect a rotational position of an output shaft of the internal combustion engine;
a rotation speed detector configured to detect a rotation speed of the internal combustion engine;
a rotational variation processor configured to compute a rotational variation of the internal combustion engine from the detected rotational position;
an influencing component eliminator configured to set a time constant of a high pass filter used in an influencing component elimination process, which applies the high pass filter to the rotational variation which cuts off a resonance frequency domain of the distortional element which eliminates an influencing component on the rotational variation of the internal combustion engine by resonance of the distortional element, based on the detected rotation speed of the internal combustion engine, where the high pass filter has a cutoff frequency set to be not lower than a specific frequency at a rate of one to two rotations of the output shaft of the internal combustion engine, and which applies the high pass filter with the set time constant to the computed rotational variation thereby obtaining an influencing component-free rotational variation with elimination of the influencing component on the rotational variation of the internal combustion engine by the resonance of the distortional element; and
an engine misfire detector configured to detect occurrence of a misfire in the internal combustion engine, based on the influencing component-free rotational variation.

2. The internal combustion engine system in accordance with claim 1, wherein the influencing component eliminator sets a transfer function of the high pass filter at a sampling cycle, which is set equal to a rotational variation of the internal combustion engine at intervals of a preset rotational angle, based on the detected rotation speed.

3. The internal combustion engine system in accordance with claim 2, wherein the transfer function is expressed by Equation (1) and a sampling time and a time constant are expressed by Equation (2) given below:

$$G=Ts/(Ts+1) \quad (1)$$

$$S/T=\theta \cdot \pi/360 \quad (2)$$

where θ, S, T, s, and G respectively denote the preset rotational angle, the sampling time, the time constant, a Laplace operator, and the transfer function.

4. The internal combustion engine system in accordance with claim 2, wherein the preset rotational angle is 30 degrees.

5. The internal combustion engine system in accordance with claim 2, wherein in a state of successively obtaining the rotational variation at the intervals of the preset rotational angle, the influencing component eliminator sets the transfer function of the high pass filter at the sampling cycle, which is set equal to the rotational variation of the internal combustion engine at the intervals of the preset rotational angle, based on the detected rotation speed and applies the set high pass filter to the rotational variation to obtain the influencing component-free rotational variation, and
in a state of not successively obtaining the rotational variation at the intervals of the preset rotational angle but obtaining a rotational variation at an interval of a 2-fold rotational angle that is twice as much as the preset rotational angle, the influencing component eliminator sets the transfer function of the high pass filter at the sampling cycle, which is set equal to the rotational variation at the interval of the 2-fold rotational angle that is twice as much as the preset rotational angle, based on the detected rotation speed and applies the set high pass filter to the rotational variation to obtain the influencing component-free rotational variation.

6. The internal combustion engine system in accordance with claim 5, wherein the rotational position detector detects the rotational position of the output shaft of the internal combustion engine by using a predetermined rotator designed to rotate in synchronism with rotation of the output shaft of the internal combustion engine and to have multiple teeth provided at intervals of a predetermined angle and a tooth-missing space as a reference position, and
the influencing component eliminator specifies a timing of tooth missing as the state of not successively obtaining the rotational variation at the intervals of the preset rotational angle but obtaining the rotational variation at the interval of the 2-fold rotational angle that is twice as much as the preset rotational angle, and sets the transfer function of the high pass filter at the sampling cycle, which is set equal to the rotational variation at the interval of the 2-fold rotational angle that is twice as much as the preset rotational angle, based on the detected rotation speed.

7. The internal combustion engine system in accordance with claim 1, wherein the rotational position detector detects the rotational position of the output shaft of the internal combustion engine by using a predetermined rotator designed to rotate in synchronism with rotation of the output shaft of the internal combustion engine and to have multiple teeth provided at intervals of a predetermined angle and a tooth-missing space as a reference position, and
the engine misfire detector detects the occurrence of a misfire in the internal combustion engine, based on a rotational variation at a tooth missing influence-free rotational position relative to a top dead center in a compression stroke of each of the multiple cylinders of the internal combustion engine, which is included in the influencing component-free rotational variation.

8. The internal combustion engine system in accordance with claim 1, wherein the rotational variation processor computes a unit rotational angle rotation time, which represents a time period required for rotating the output shaft of the internal combustion engine by a preset unit rotational angle in response to every rotation of the output shaft by the preset unit rotational angle, as the rotational variation of the internal combustion engine.

9. The internal combustion engine system in accordance with claim 1, the internal combustion engine system further having:

an electric power-mechanical power input output assembly connected with the output shaft of the internal combustion engine via the distortional element and with the driveshaft and configured to input and output power from and to the output shaft and the driveshaft through input and output of electric power and mechanical power.

10. The internal combustion engine system in accordance with claim 9, wherein the electric power-mechanical power input output assembly includes: a three shaft-type power input output structure connected with three shafts, the output shaft of the internal combustion engine, the driveshaft, and a rotating shaft and configured to input and output power to and from a residual shaft based on powers input to and output from any two shafts among the three shafts; and a motor constructed to input and output power from and to the rotating shaft.

11. An engine misfire detection method of detecting occurrence of a misfire in a multi-cylinder internal combustion engine, which is included in an internal combustion engine system and is constructed to output power to a driveshaft via a distortional element, the engine misfire detection method comprising:

computing a rotational variation of the internal combustion engine from a rotational position of the output shaft of the internal combustion engine;

setting a time constant of the high pass filter used in an influencing component elimination process, which applies the high pass filter to the rotational variation to cut off a resonance frequency domain of the distortional element to eliminate an influencing component on the rotational variation of the internal combustion engine by resonance of the distortional element, based on a rotation speed of the internal combustion engine, where the high pass filter has a cutoff frequency set to be not lower than a specific frequency at a rate of one to two rotations of the output shaft of the internal combustion engine;

applying the influencing element elimination process using the high pass filter with the set time constant to the computed rotational variation, so as to obtain an influencing component-free rotational variation with elimination of the influencing component on the rotational variation of the internal combustion engine by the resonance of the distortional element; and detecting occurrence of a misfire in the internal combustion engine, based on the influencing component-free rotational variation.

12. The engine misfire detection method in accordance with claim 11, the engine misfire detection method setting a transfer function of the high pass filter at a sampling cycle, which is set equal to a rotational variation of the internal combustion engine at intervals of a preset rotational angle, based on the detected rotation speed, applying the high pass filter with the set transfer function to the rotational variation as the influencing component elimination process to obtain the influencing component-free rotational variation, and detecting the occurrence of a misfire in the internal combustion engine based on the influencing component-free rotational variation.

13. The engine misfire detection method in accordance with claim 12, in a state of successively obtaining the rotational variation at the intervals of the preset rotational angle, the engine misfire detection method setting the transfer function of the high pass filter at the sampling cycle, which is set equal to the rotational variation of the internal combustion engine at the intervals of the preset rotational angle, based on the detected rotation speed, applying the set high pass filter to the rotational variation to obtain the influencing component-free rotational variation, and detecting the occurrence of a misfire in the internal combustion engine based on the influencing component-free rotational variation, in a state of not successively obtaining the rotational variation at the intervals of the preset rotational angle but obtaining a rotational variation at an interval of a 2-fold rotational angle that is twice as much as the preset rotational angle, the engine misfire detection method setting the transfer function of the high pass filter at the sampling cycle, which is set equal to the rotational variation at the interval of the 2-fold rotational angle that is twice as much as the preset rotational angle, based on the detected rotation speed, applying the set high pass filter to the rotational variation to obtain the influencing component-free rotational variation, and detecting the occurrence of a misfire in the internal combustion engine based on the influencing component-free rotational variation.

14. The engine misfire detection method in accordance with claim 13, the engine misfire detection method computing the rotation speed of the internal combustion engine from the rotational position of the output shaft of the internal combustion engine, which is obtained by using a predetermined rotator designed to rotate in synchronism with rotation of the output shaft of the internal combustion engine and to have multiple teeth provided at intervals of a predetermined angle and a tooth-missing space as a reference position, the engine misfire detection method specifying a timing of tooth missing as the state of not successively obtaining the rotational variation at the intervals of the preset rotational angle but obtaining the rotational variation at the interval of the 2-fold rotational angle that is twice as much as the preset rotational angle, setting the transfer function of the high pass filter at the sampling cycle, which is set equal to the rotational variation at the interval of the 2-fold rotational angle that is twice as much as the preset rotational angle, based on the detected rotation speed, applying the set high pass filter to the rotational variation to obtain the influencing component-free rotational variation, and detecting the occurrence of a misfire in the internal combustion engine based on the influencing component-free rotational variation.

15. The engine misfire detection method in accordance with claim 11, the engine misfire detection method computing the rotation speed of the internal combustion engine from the rotational position of the output shaft of the internal combustion engine, which is obtained by using a predetermined rotator designed to rotate in synchronism with rotation of the output shaft of the internal combustion engine and to have multiple teeth provided at intervals of a predetermined angle and a tooth-missing space as a reference position, the engine misfire detection method detecting the occurrence of a misfire in the internal combustion engine, based on a rotational variation at a tooth missing influence-free rotational position relative to a top dead center in a compression stroke of each of the multiple cylinders of the internal combustion engine, which is included in the influencing component-free rotational variation.

* * * * *